United States Patent
Bagni et al.

(10) Patent No.: US 6,215,820 B1
(45) Date of Patent: Apr. 10, 2001

(54) CONSTANT BIT-RATE CONTROL IN A VIDEO CODER BY WAY OF PRE-ANALYSIS OF A SLICE OF THE PICTURES

(75) Inventors: Daniele Bagni, Olgiate Molgora; Mattia De Bei, Sottomarina; Gian Antonio Mian, Padova; Maria Luisa Sacchi, Milan, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/415,692

(22) Filed: Oct. 8, 1999

(30) Foreign Application Priority Data

Oct. 12, 1998 (EP) .................................................. 98830599

(51) Int. Cl.$^7$ ...................................................... H04N 7/12
(52) U.S. Cl. ............................................................ 375/240
(58) Field of Search ................................. 348/419, 405; 375/240

(56) References Cited

U.S. PATENT DOCUMENTS

| | | | |
|---|---|---|---|
| 5,686,964 | * 11/1997 | Tabatabai et al. | 348/420 |
| 5,691,770 | * 11/1997 | Keesman et al. | 348/405 |
| 5,731,835 | * 3/1998 | Kuchibhotla | 348/390 |
| 5,757,434 | * 5/1998 | Klein Gunnewiek et al. | 348/405 |
| 5,801,779 | * 9/1998 | Uz et al. | 348/420 |
| 5,835,149 | * 11/1998 | Astle | 348/419 |
| 5,949,490 | * 9/1999 | Borgwardt et al. | 348/419 |
| 5,986,712 | * 11/1999 | Peterson et al. | 348/411 |

\* cited by examiner

Primary Examiner—Chris Kelley
(74) Attorney, Agent, or Firm—Theodore E. Galanthay; Allen, Dyer, Doppelt, Milbrath & Gilchrist, P.A.

(57) ABSTRACT

An algorithm based on a pre-analysis implements an efficient constant bit-rate control with a reduced requirement on a buffer memory capacity. The pre-analysis is on at least one slice (GOS) of the current whole picture, and/or on a mix of information on the pre-analysis of a slice of the preceding picture and on the actual encoding data of the preceding whole picture. The pre-analysis may be carried out by precoding the GOS with a constant reference quantizer or by entropy computation. The local control of the bit-rate is implemented by an integrative-proportional controller.

23 Claims, 9 Drawing Sheets

CONSTANT BIT-RATE CONTROL IN A VIDEO CODER BY WAY OF PRE-ANALYSIS OF A SLICE OF THE PICTURES

FIELD OF THE INVENTION

The present invention relates in general to the processing of digitized pictures, and, more particularly, to a picture coder having an output data stream with a constant bit-rate (CBR) to satisfy transmission and recording system requirements.

BACKGROUND OF THE INVENTION

A precise control on the number of bits per Group-Of-Pictures (GOP) is very important when recording a coded video sequence on an appropriate support, e.g., a CD-ROM, according to the MPEG2 standard. Since the GOP are regularly spaced, this permits simple play back operations, such as fast-forward and fast-reverse.

Only few pictures of the sequence are visualized during these reproducing operations. In particular, only the intra picture (I) is decoded. The I picture is the only one allowing a random access because they are independently coded from the rest of the sequence. Therefore, the reproduction includes searching within the bit-stream and decoding the first frame (I) of each GOP. This search may take place by a jump approximately close to the start of the GOP, and then by reading the bit-stream looking for the start code of the picture. Alternatively, a limited number of filler bits are inserted to make exactly constant the number of bits per GOP. This eliminates searching in the bit-stream.

Another advantage is the simplification of picture editing. It is possible to take a small portion of film, modify it, record it and insert it with precision in the same bit-stream interval. Without this capability, it would be necessary to read and save the entire bit-stream to assign the necessary space to the modified sequence.

There are two common objectives of any CBR system for controlling the bit-rate include the following. First, the desired or target bit-rate is preliminarily fixed and the pictures of a certain complete detail are taken into consideration for determining the coding quality. Therefore, the appropriate parameters for regulating the coding is such to obtain the predefined bit-rate. Second, a local quality is maintained as uniform as possible through a control process within the sequence.

The ability to accurately control the number of bits produced by each frame has consequences also upon the quality of the coded sequence. When the control system assigns the target bit-rate for the frame to be coded, it also distributes the remaining bits in the GOP among the frames that are still to be coded. If the bits produced by the frame coding are greater in number than the predicted ones, the GOP will have less bits than previously planned. Thereby, the control system will have to reduce the bits at disposal of the successive frames, which consequently, penalizes their quality. These problems occur mainly when there are substantial changes of the picture statistics, and, therefore, in their complexity. This typically occurs upon changes of a scene. The two objectives mentioned above are then conflicting.

In the ensuing description, reference will be made to the following publications on these topics and their pertinent contents are recalled as needed:

[1] International Standard ISO/IEC 13818 (MPEG2), "Information Technology—Generic Coding Of Moving Pictures And Associated Audio", March 1994.

[2] B. G. Haskell, A. Puri, A. N. Netravali, "Digital Video: An Introduction To MPEG2", Chapman & Hall, ISBN 0-412-08411-2.

[3] Test Model Editing Committee, "MPEG2 Video Test Model 5", ISO/IEC JTC1/SC29/WG11, April 1993.

[4] G. Keesman, I. Shah, R. Klein-Gunnewiek, "Bit-Rate Control For MPEG Encoders", Signal Processing: Image Communication 6 (1995) pp. 545–560.

[5] W. Ding, B. Liu, "Rate Control Of MPEG Video Coding And Recording By Rate-Quantization Modeling", IEEE Transactions on Circuits and Systems for Video Technology, vol. 6, no. 1, February 1996.

[6] S. Bilato, G. Calvagno, G. A. Mian, R. Rinaldo, "Accurate Bit-Rate And Quality Control For The MPEG2 Video Coder", proceedings of ICIP-97 (International Conference on Image Processing), Santa Barbara, 1997.

The article by Keesman et al. describes the finding of a compromise between the two contrasting objectives by introducing a technique based on defining a Bit Usage Profile which allows prediction on how the bits should be distributed within a picture. Such a technique is also described by Mian et al.

In the majority of video coders there is a control signal which directly influences the regulation of the local quality of a picture. Such a signal will be symbolized by Qj, where Q stands for a quantizer. A high value of Qj corresponds to a low quality of the image (coarse quantization) while a moderate value corresponds to a higher viewing quality (fine quantization). The objective of keeping a uniform quality is then equivalent to having a substantially constant control signal Qj within the picture and possibly throughout the entire sequence of pictures.

According to the system or model described in the "MPEG2 Video Test Model 5" article, hereinafter also referred to as the TM5 model, and also according to other CBR models cited in the bibliography, such as in the Ding et al. article, for example, control of the bit-rate is typically achieved in three phases:

1) estimating the global target bit-rate (Global Target Bit Allocation), wherein a prediction of the number of bits required for each picture of the sequence is generated. The complexity of the picture and the state of filling of the output data buffer must be considered;

2) determining the reference value $Qj[n]$ of the local quantization parameter (Local Control) for the n-th macroblock ($MB_n$) that satisfies a previously estimated target bit-rate;

3) calculating the effective quantization parameter mquant [n] for each macroblock, and generating it as a function of the filling state of the output buffer and of the activity of the macroblock itself (Adaptive Quantization).

According to the reference model disclosed in the TM5 article, the latter function is considered a substantial part of the bit-rate control. According to other known systems as disclosed in the Keesman et al. article, the Ding et al. article and the Mian et al. article, as well as in the context of the system of the present invention, this function is considered a separate problem when concerning the conversion of the control signal Qi [n] in the regulating parameters of the mquant [n] encoder. This conversion is according to the formula:

$$mquant[n]Qj[n] \cdot \left( \frac{2 \cdot act[n] + avg\_act}{act[n] + 2 \cdot avg\_act} \right)$$

The variable act [n] is a measure of the detail of the picture based on the variance of the n-th macroblock, while avg_act is the average value of act [n] on the whole picture. The expression within the brackets is often referred to as the normalized activity Nact[f]. Therefore, in the ensuing description, the Adaptive Quantization will not be taken into consideration because it is a separate function, and it is not directly involved in the algorithm of the present invention.

Both the Global Target estimation and the Local Control use information on how to distribute the bits among the different pictures of the sequence and within the single pictures. This information may be derived from the previously coded pictures according to the TM5 article, or by modeling the rate quantization curve according to the system described in Ding et al., or derived from a pre-analysis carried out on each picture, as in Keesman et al. and Mian et al.

In the system described by Mian et al., a pre-analysis is carried out to calculate the entropy of the DCT coefficients after having approximated the probability density function using histograms. By establishing a certain quantizer $Q^*$, the entropy HN of the n-th quantizer DCT coefficient is calculated as follows. The variable Pk,n indicates the probability to obtain the K-th symbol at the output of the quantization. Therefore, the average entropy represents the actual bit-rate R:

$$R = H(Q*) = \frac{1}{64} \cdot \sum_{1}^{64} Hn(Q*)$$

The estimates obtained with the statistical model when the quantizer $Q^*$ for each macroblock is fixed are in accordance with the performances of an MPEG2 encoder. The variable $Q^*$ represents the average value of the quantizer effectively used in Mian et al.

It should be noted that with this method only global estimates, i.e., a whole picture, of the actual bit-rate R may be obtained. This is so since the histograms require a large number of samples to be statistically valid. Hence, a possible local level estimate of the single n-th macroblock is lost. The pre-analysis with pre-coding, according to the method described in Keesman et al., forms a first example of reference and comparison. This is reported below as a basis for subsequently describing the method of the invention and to point out the differences therebetween.

Control Of The Bit-Rate With Picture Pre-Analysis. The scheme of FIG. 1 highlights the following elements of the functional coding blocks:

a) an MPEG2 encoder implementing a hybrid scheme of DCT interframe coding, according to the "Information Technology—Generic Coding Of Moving Pictures And Associated Audio" article and the Haskell et al. article;

b) an adaptive quantization block input with the control signal Qj[n] and which outputs the effective quantizer parameter mquant[n];

c) a block computing the estimated global number of bits (Global Target Bit Allocation), using information derived from previously coded pictures and using information derived from a pre-analysis of the current picture;

d) a block computing the Bit Usage Profile (BUP) using information derived from the above-mentioned pre-analysis;

e) a proportional-integrative local controller (P-I which obtains the right Qj signal that will produce the required bit-rate).

This bit-rate control scheme presents some important differences as compared to the TM5 model:

1) In the computation of the global target a difference is made between overhead data and the data relative to the coding of the DCT coefficients. The expression overhead bits refers to all the bits not used for coding the DCT coefficients, such as the coding data of motion vectors, slice address, type of macroblock, address of the successive macroblock, type of quantization employed, etc.

2) In the TM5 model, a P controller (Proportional) is used. In the system of the present invention a P-I controller (Proportional-Integrative) is used.

3) The P-I controller of the bit-rate employs a Bit Usage Profile prediction technique reducing the number of control actions.

Global Target Allocation. An assumption is that the complexity of pictures of the same type are constant in time (stationary property), and have a number of R bits available for a GOP. The calculation of the target bit-rate is carried out before a true coding is performed for reserving a sufficient number of bits for the remaining pictures belonging to the considered GOP.

Therefore, if S[n] represents the required number of bits to code the n-th picture and if k pictures of the current GOP have already been coded, there will be Rl bits for coding the remaining N-k pictures of the GOP in question. By calling T[n] the estimated number of bits (target) for a current picture, then:

$$Rl = R - \sum_{n=0}^{k-1} S[n] = \sum_{n=k}^{N-1} T[n] \qquad (1)$$

An assumption is made that the number of bits per picture necessary for the encoding is equal for all the pictures of the same type in accordance to the above mentioned hypothesis of the stationary property. This assumption is reasonable if we consider the coding of pictures of similar contents from the point of view of their complexity, e.g., by assuming that there are no changes of scene.

The targets for I, P or B pictures are indicated with Ti, Tp, and Tb respectively. The number of I, P and B pictures in the GOP that remain coded is indicated with Ni, Np and Nb, respectively. In line with the above assumptions:

$$Rl = Ni \cdot Ti + NP \cdot Tp + Nb \cdot Tb \qquad (2)$$

The coding of a picture yields two types of data. The bits used to code the DCT coefficients (Hoffman coding), and the bits used to code the overhead information, i.e., all that is not a DCT coefficient. In the following paragraphs, the symbol "$Q^*$" is used to identify the different types of coding for I, P or B frames. The overhead data of a generic picture, denoted by $Q^*$, is generally independent of the average control signal QM. This is considered the average of mquant [n] over a picture, while the number of bits for coding the DCT coefficients, denoted by $Q^*$, depends on the quantization parameters. Therefore:

$$T^* = C^* + O^* \qquad (3)$$

The number of bits required for the DCT coefficients depends not only on the average control signal QM but also on the content of the picture, a measure which may be the complexity $X^*$. Similarly to the TM5 technique, we assume the validity of the following relation for each type of picture:

$$X^* = C^* \cdot QM \quad (4)$$

The complexity $Q^*$ may be obtained either from previously coded pictures of the same type of the current one or through a pre-analysis, which includes preceding with a fixed and constant Qj [n]. In any case, the complexities Xi, Mp and Eb of the different pictures may be assumed known.

To obtain a uniform quality in time, average values for the control signal with constant ratios are chosen, relative to the different type of pictures:

$$Kip \cdot Qi = Qp \quad (5)$$

$$Kpb \cdot Qp = Qb$$

The variable Qi, QP and QB are the average values QM relative to the I, P and B pictures. The constants Kip and Kub establish the scaling factor of the global complexities used in calculating the global targets. In the Mian et al. article Kip=1.0 and Kub=1.0 were selected, while in the TM5 model Kip=.0 and Kub=1.4 were selected.

At this point it is possible to derive the equations for the global targets. First, estimates of the Oi, Op and Ob values are obtained from the pre-analysis. It is also possible to estimate the overhead from the data of the last frame encoded in the same manner of the current one. The estimated values for the variables $Q^*$ are derived by solving a system of equations. For clarity of notation, the variable RL is introduced:

$$RL = Rl - (Ni \cdot Oi + Np \cdot Op + Nb \cdot Ob) = Ni \cdot Ci + Np \cdot Cp + Nb \cdot Cb \quad (6)$$

The variable RL denotes the number of bits left for the DCT coefficients without any the overhead data.

At this stage, there are six equations: the relationship (4) which represents three equations, the two equations (5) and the equation (6), and six unknown variables Ci, Cp, Cb, Qi, Qp and Qb. The values of Ni, Np, Nb and the complexity values $Q^*$ are known from the pre-analysis or taken from previous encodes. The following global target equations for the DCT data can be derived by simple algebra type operations:

$$Ci = \frac{Xi \cdot RL}{Ni \cdot Xi + Np \cdot Xp/Kip + Nb \cdot Xb/(Kip \cdot Kpb)} \quad (7)$$

$$Cp = \frac{Xp \cdot Ci}{Kip \cdot Xi}$$

$$Cb = \frac{Xb \cdot Ci}{Kip \cdot Kpb \cdot Xi}$$

From equations (7) it may be observed that the global targets distribute the bits among the pictures according to the relative complexities. Abrupt changes of a scene are a problem for the computation model of the global targets. In fact, up to this point the global complexities are partially obtained from pictures that have been already coded in the same manner.

For the B or P pictures, such a prediction does not create a problem even in the case of an abrupt change of content of the pictures of the sequence. However, for the I pictures there may be some problems because the distance among them may be at 12 frames. The pre-analysis may give more reliable information on the global complexities in presence of changes of a scene. In any case, after a change of scene there is a short period of time in which the human sight is less sensible to the blurring effect of the pictures. This phenomenon allows the use of global targets lower than what would be necessary, and causes the generation of coding errors in pictures immediately following a change of scene.

The Mian et al. algorithm employs a similar procedure of Global Target calculation, and, therefore, leads to the same solutions expressed by the equations (7).

Local Control. The algorithm for estimating the global targets obtains, as explained above, the average value QM of the different mquant[n] and the average number of bits per macroblock. If too many bits are used for a portion of the picture, the Qj[n] of the Macroblock of the remaining portions of the picture must be incremented accordingly to obtain a bit-rate of the picture as compliant as possible with the global target. This is at the expense in the uniformity of the quality.

For each macroblock, the local control computes the relative control signal Qj[n] using information on the Macroblock already encoded and information on the bit usage. The model is thoroughly analyzed in the Keesman et al. article which contains an analysis of the stability based on the Theory of Automatic Controls.

FIG. 2 shows a block diagram of the local control. A unit of time is taken as the interval between the encoding of two successive Macroblocks. Therefore, the n-th instant indicates the encoding instant of the n-th macroblock of the current picture. The variables used in this analysis, which are functions of time n, and indicated in the scheme of FIG. 2 are as follows:

Qj[n] is the value of the reference quantization parameter for the n-th macroblock (MB);

s[n] is the number of bits obtained upon effectively coding of the n-th macroblock;

b[n] is the effective filling state of the output buffer;

b[n] is the estimated number of coding bits for the macroblock being derived from the information produced at the end of the pre-analysis;

t[n] is the estimated filling state of the buffer (i.e., the target state);

b[n] is the number of transmitted bits (eliminated from the output buffer) in the time interval of the n-th macroblock. The term b[n] appears twice in the scheme. It is subtracted from the number of bits s[n] produced to calculate the real filling stage of the buffer b[n], and is also subtracted from the estimated number of bits b[n] to reach the estimated filling state t[n] of the buffer;

e[n] is the error between the estimated and effective filling state of the buffer, that is:

$$e[n] = t[n] - b[n] \quad (8)$$

The functional blocks of the scheme of FIG. 2 are:

PI: the Proportional-Integrative local control block for selecting the value of Qj[n] depending on the detected error;

MPEG ENCODER: the encoding block. This transforms the selected value Qj[n] and the obtained number of bits s[n] and also represents the adaptive quantization;

BUFFER: a data accumulator (memory buffer). Its input x and output y are linked by the formula y[n]=y[n−1]+x[n], which, in terms of the Zeta Transform, becomes:

$$Y(z) = \frac{1}{1-z^{-1}} \cdot X(z)$$

E(z), B(z), T(z) and P(z) are the Zeta Transforms of e[n], b[n], t[n] and b[n], respectively. The error signal E(z) is the difference between the buffer content B(z) and the desired content T(z). The latter signal is obtained by integrating the bit profile P(z) which represents the expected number of bits per macroblock. According to the TM5 model, this number is constant within a picture, that is, it is a hypothesized uniform spread of bits among all the Macroblock.

The Local Controller, whose architecture is shown in FIG. 3, obtains the Qj(z) signal from the error signal E(z). The controller is a proportionally-integrative (P-I) type having a proportional path with a KP gain and an integrative path with a KI gain. From preliminary tests and from the indications present in Keesman et al.: KP=0.01 and KI=0.001. The following equation links the quantization parameter Qj(z) to the E(z) error:

$$Qj(z) = \left(KP + KI \frac{1}{1-z^{-1}}\right) \cdot E(z) \tag{9}$$

Using the inverse transform and by recursively proceeding to the 0 instant, wherein e[0]=0:

$$Qj[n] = Qj_{REF} + KP \cdot e[n] + KI \cdot \sum_{v=1}^{n} e(u) \tag{10}$$

The variable $QJ_{REF}$ is the constant reference quantization parameter for the picture that is used in the pre-analysis, and which may be calculated in different ways. This parameter is the average of the Qj[n] of the preceding picture regardless of the type, that is:

$$Qj_{REF} = \frac{1}{allMB} \sum_{n=i}^{allMB} Qj[n] \tag{11}$$

The variables QM and $QJ_{REF}$ are the average values of mquant[n] and Qj[n], respectively, for the whole picture. They are linked by the average value of the normalized activity Nact[j]. The choice of a proportional-integrative (P-I) controller provides for a regulation without static error, while a proportional (P) controller is affected by the static error component. One such proportional (P) controller is in the TM5 model, which is also adopted by Mian et al.

A compromise is necessary in selecting the controller parameters KI and KP to achieve both the stated objectives. If a low gain is set in the control loop, for example, KP is close to zero, there is a loss of control. In such a case, the quality of the picture may be very uniform but the bit-rate will not be predictable. An encoder with a relaxed control of the used bits may incur into problems every time there are overflow or underflow situations. On the other hand, if a high gain is set, for example, KP is close to 1 to implement a higher control of the bit-rate, the quality of the picture may not be constant. To solve this problem, the Bit Usage Profile is used.

The Bit Usage Profile. The objective is to determine in advance the number of bits t[n] that will be necessary for each macroblock. This approach is referred to as Bit Usage Profile. A pre-analysis is used (see Keesman et al.) in which a complete encoding of the current picture is done using a constant Qj[n] value. Therefore, the number of bits s[n] that each macroblock uses during this preceding process is obtained.

Similarly to what is done for the global complexity Q* of a picture, a local complexity of a macroblock is defined as:

$$x[n]=s[n]=Qj[n] \tag{12}$$

with the following condition:

$$X* = \sum_{allMAB} s[n] \tag{13}$$

The Bit Usage Profile (BUP) of each macroblock is indicated by t[n]. This profile represents the estimated number of bits that each macroblock will use for effective encoding, with the condition that the sum of the various t[n] be equal to the global target T*. In other words:

$$T^* = \sum_{allMB} t[n] \tag{14}$$

By redistributing the t[n] bits among the various Macroblock of the picture and depending on their complexity x[n], the following equation is derived:

$$\frac{t[n]}{x[n]} = \frac{T*}{X*} = \frac{T*}{\sum x[n]} \tag{15}$$

Assuming that during precoding Qj[n] is constant, e.g., equal to $Qj_{REF}$, the various Macroblocks are obtained:

$$BUP = t[n] = \frac{T^* x[n]}{\sum x[n]} \tag{16}$$

$$= \frac{T^* \cdot s[n] \cdot Qm}{\sum (s[n] \cdot Qm)}$$

$$= \frac{T^* \cdot s[n] \cdot Qj_{REF}}{Qm \cdot \sum s[n]}$$

$$= T* \cdot \frac{s[n]}{\sum s[n]}$$

The TM5 model assumes a uniform bit distribution among the different Macroblocks, that is $$BUP = \frac{T}{\#MB}.$$

Referring to equation (10), a symbolic level which describes the local control model remains unchanged and valid, although the value ten] of equation (8) is the BUP described by equation (16).

The algorithms described in Keesman et al. and Mian et al. produce an optimal quality and an accurate control of the bit-rate. However, their main application is substantially restricted to the professional market sector where processing delays of a certain entity may be tolerated. In addition, costly memories may be used to resynchronize the video and audio packets. Nevertheless, the pre-analysis inevitably lengthens the processing time of the video stream. On the other hand, the consumer market sector imposes the use of the least amount of memory space to limit costs.

SUMMARY OF THE INVENTION

An object of the present invention is to provide a Constant Bit-Rate (CBR) control method for hybrid DPCM-DCT video coding systems, such as MPEG1, H.263 and H.261. More particularly, a CBR control method is provided for coding systems according to the MPEG2 standard. This results in a reduced memory capacity requirement, and, therefore, reduced hardware costs without a notable loss of the quality of the transferred pictures as compared to known control systems.

The method of the invention keeps constant the output bit-rate produced at the end of the coding process with a high accuracy. This is done by using a mix of information derived from the effective encoding of preceding pictures, from the pre-analysis of preceding pictures, and from a pre-analysis advantageously executed on a certain group of slices or even on a single slice (GOS) of the current picture. A slice is formed by at least a whole line of a macroblock of a picture.

According to preferred embodiments, a GOS pre-analysis may be alternatively carried out:

a) by preceding one or more lines of a macroblock (slice) with a constant reference quantizer;

b) by a statistical calculation (with histograms) of the entropy of the DCT coefficients that approximates the average characteristic waveform of the bits necessary to encode the DCT coefficients.

As compared to a CBR controller of the prior art using a pre-analysis of the whole current picture, the system of the invention provides for an accurate control. This is done while preserving quality of the pictures compared to those of known systems, but with a reduced processing delay and a reduced memory requirement for managing pre-analysis data. By conducting a pre-analysis on a current GOS rather than on the whole current picture, it is necessary to store information limited to the current GOS. This reduces the memory requirement, the surface area occupied on the silicon and the overall cost of the device.

In addition, the time of pre-analysis of a GOS rather than of the whole picture is much shorter. This facilitates synchronization among the audio and video packets. By operating a pre-analysis on a current slice or group of slices of length equal to the width of the picture, it is possible to retain a picture quality that is indistinguishable from that of the known systems. The maximum number of slices is four at the time. This is obtained by defining a distribution within each slice of the target bits as a reference for the calculation of the quantization parameter Qj at the local control level. This technique is referred to as Target Bit Usage Profile (TBUP) and forms a signifigant aspect of the novel algorithm of the invention.

According to the method of the invention, not having pre-analysis data of the whole current picture, but just those of a GOS thereof, is used to implement the TBUP technique according to the two alternative pre-analysis methods mentioned in the above paragraphs labeled as a) and b). The data is a mix of the data of the pre-analysis of the GOS of the preceding picture (regardless of its type I, P or B), and of the effective encoding of the preceding picture (regardless of its type I, P or B). The requested memory capacity to store the above mentioned data is negligible because the data related to the number of slices or GOS is contained in one whole picture.

To implement a tight bit-rate control while preserving a substantially uniform quality of the pictures, the Bit Usage Profile (BUP) of each macroblock representing the estimated number of bits that each macroblock will be using for the effective encoding is computed. In case of a pre-analysis according to the paragraph a) mode involving the preceding of a slice or multislice GOS of the current picture, the BUP is obtained by determining in advance the number of bits necessary for each macroblock through the pre-analysis itself.

In case of a pre-analysis according to the paragraph b) mode involving the calculation of the entropy on a slice or multislice GOS of the current picture, the BUP cannot be obtained from the pre-analysis itself. The pre-analysis is only capable of producing an estimate limited to the GOS being processed, and not for each macroblock. However, even for this second embodiment, the BUP may be obtained by determining the number of bits necessary for each macroblock from the information stored during the effective coding of the GOS of the preceding picture.

DETAILED DESCRIPTION OF THE PREFERRED EMBODIMENTS

Figure 1:
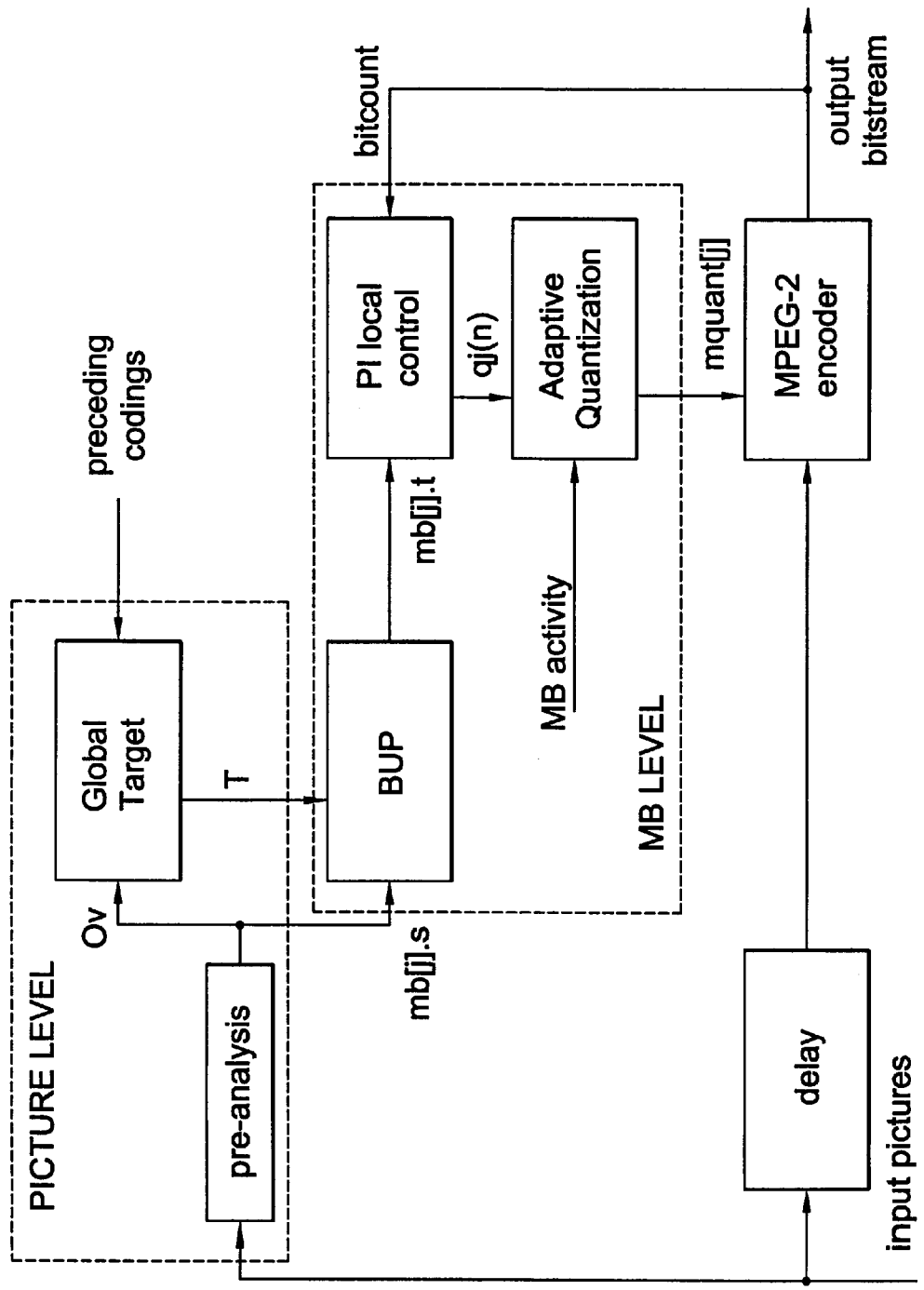
FIG. 1 is a functional block diagram of a CBR control algorithm with pre-analysis of the whole picture according to the prior art.
Figure 2:
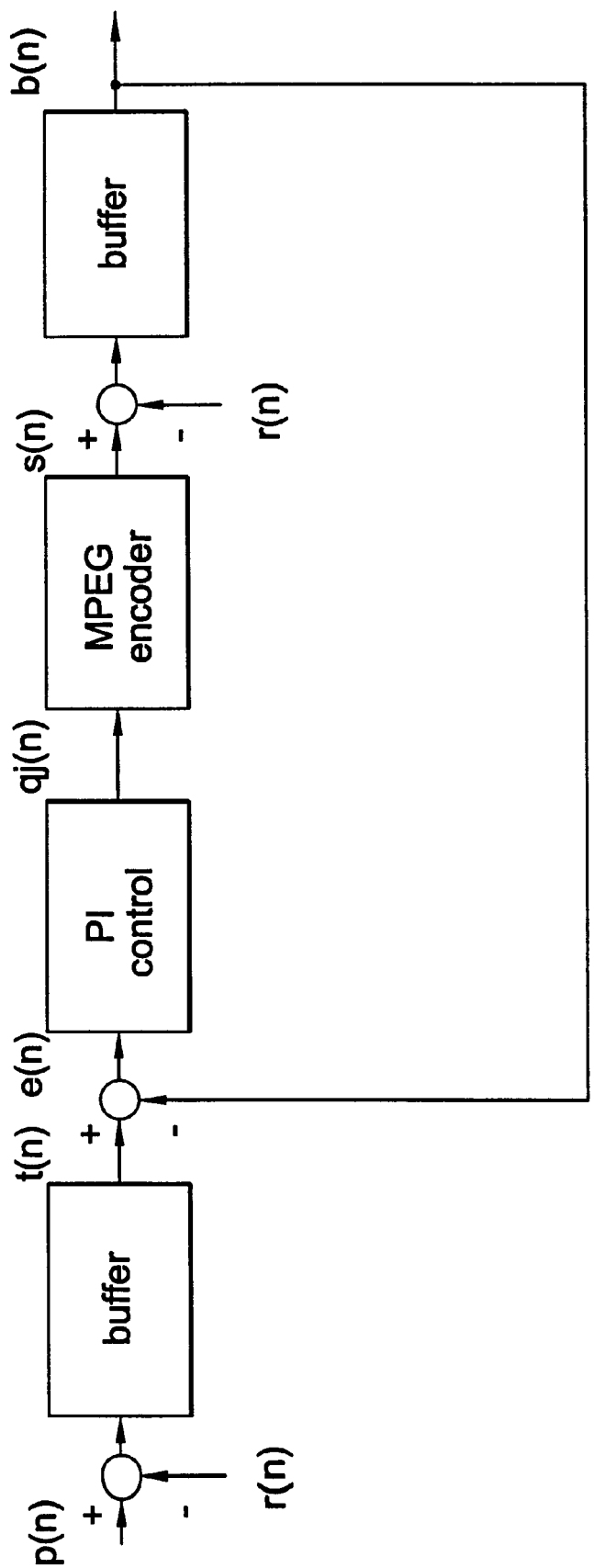
FIG. 2 is an architectural block diagram of the CBR control function of an MPEG encoder according to the prior art.
Figure 3:
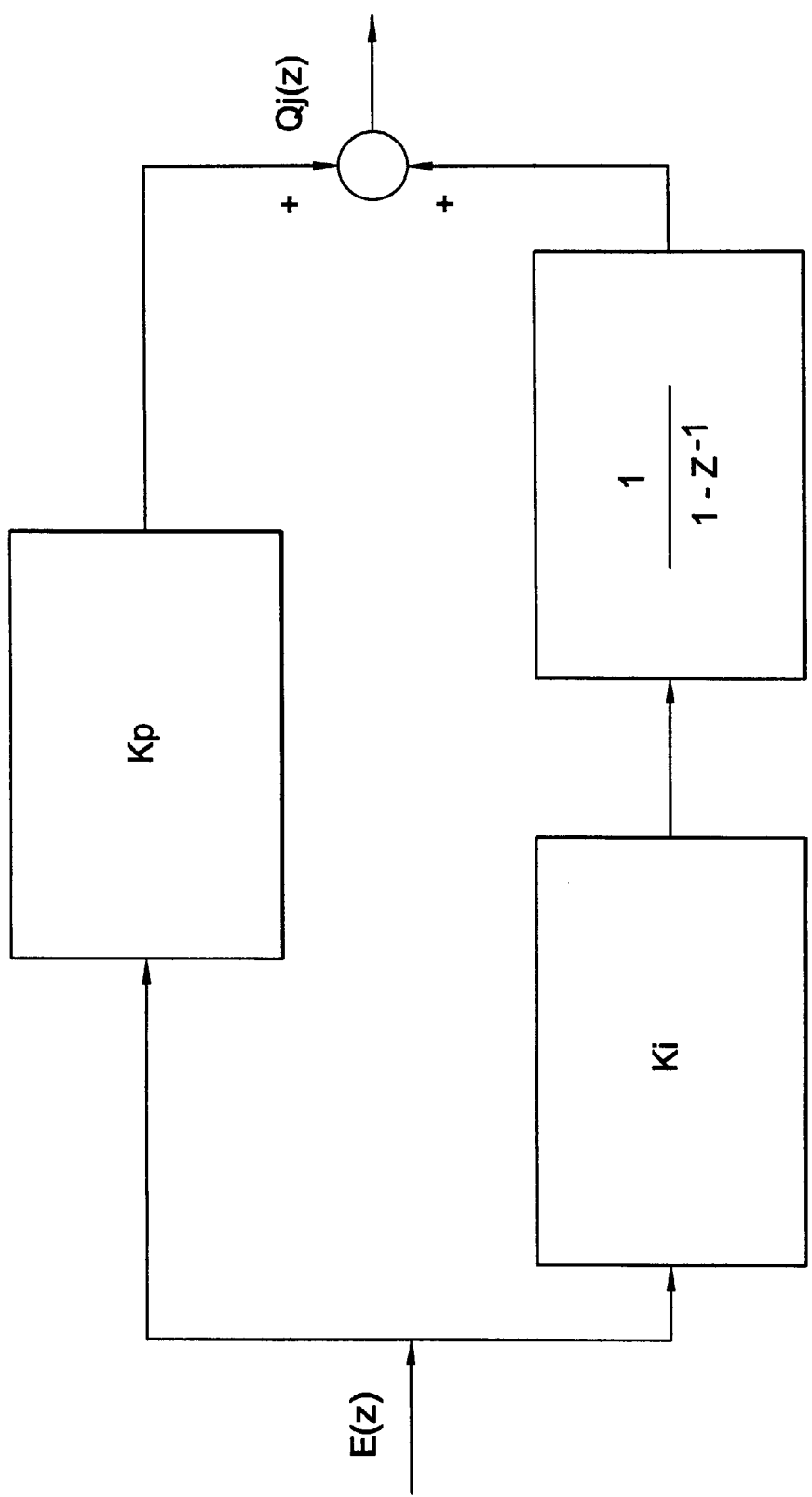
FIG. 3 is an architectural scheme of a proportional-integrative local controller according to the prior art.
Figure 4:
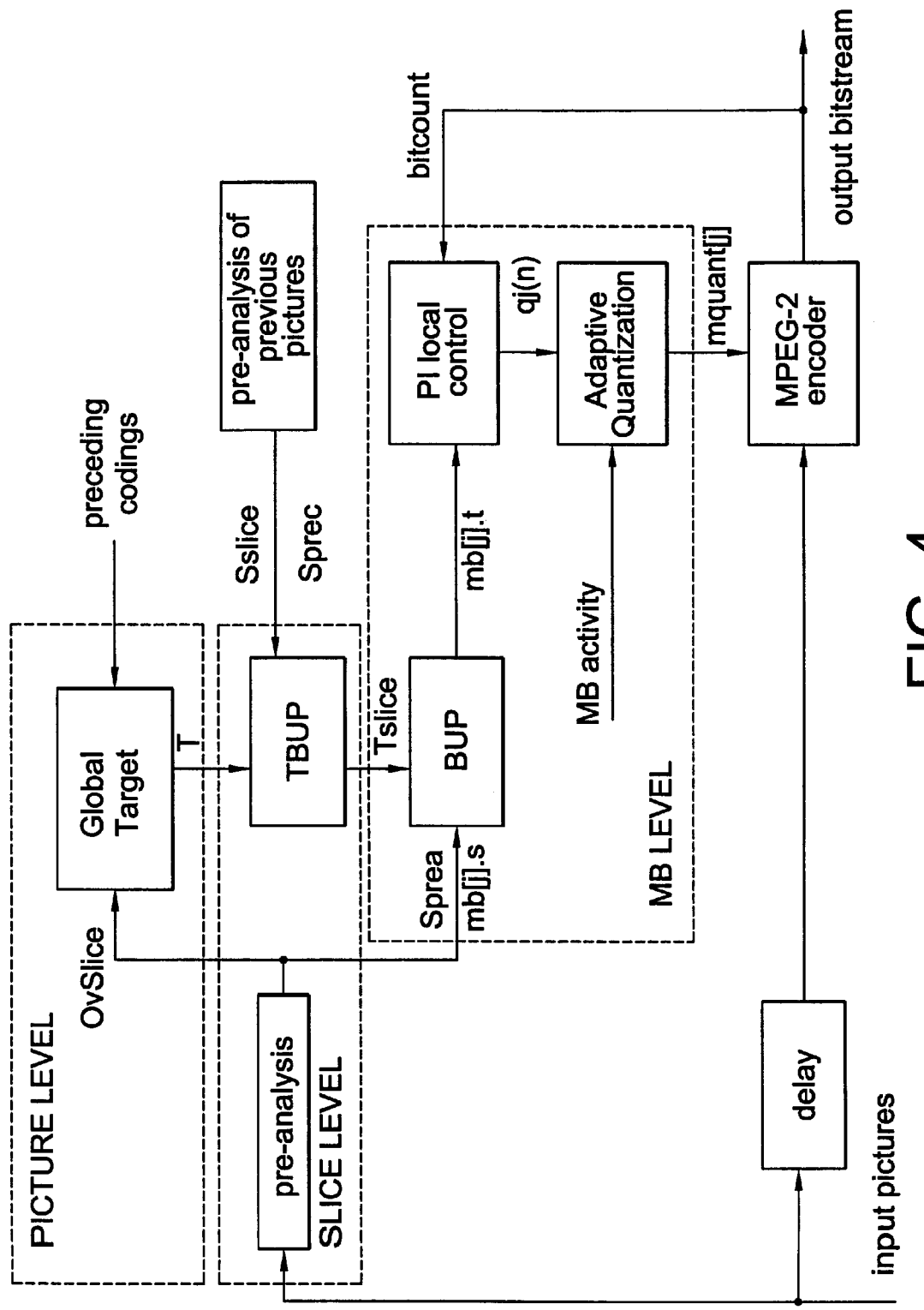
FIG. 4 is a functional block diagram of a CBR control algorithm with pre-analysis of a GOS according to the present invention.

Referring to FIG. 4, the ensuing description of the system of the invention follows the format used to describe the prior art system of FIG. 2. The differences between the system of the invention and the prior art system will be highlighted.

Global Target Bit Allocation. Using the method of the invention, the relationships expressed in equations (3), (4), (5), (6), and (7) are still applicable. According to the invention, by carrying out a pre-analysis on a GOS at the beginning of the actual encoding, information in the overhead data for the whole picture is not available.

A comparison between the number of overhead bits estimated by the pre-analysis on the first GOS is multiplied by the number of GOS, and the overhead is calculated in the pre-analysis of preceding pictures of the same type. The lower of these two values is used for calculating the global target. This underestimates the number of DCT bits not estimated for the remaining pictures of the GOP, and produces a less stringent global target for the current frame.

For the first P and B pictures of each GOP, excluding the first, the overhead is calculated as the average of the overheads of the preceding GOP to have a more realistic estimate given the lack of information at the beginning of a new GOP. Since the I picture is not subject to motion compensation, it is characterized by a smaller number of overheads bits than the other types of pictures P or B. It is also then treated separately by considering the overhead of the corresponding I picture of the preceding GOP.

The same applies also for Q* in equation (4), which may no longer be obtained from the pre-analysis because at the end of the processing of the first GOS there is not enough information on the whole picture. However, Q* is obtained by considering the DCT bits of the pictures of the same type previously encoded.

Bit Usage Profile. As already explained, the BUP permits a tight control of the bit-rate while preserving uniformity of the quality of the pictures. According to the method of the invention, the BUP is obtained by determining in advance the number of bits that will be needed for each macroblock t[n] through a pre-analysis on the slice that is about to be encoded. The pre-analysis includes pre-coding all the macroblock of the current GOS keeping the quantization parameter Qj constant. This is similar to what is done in Keesman et al. In this way, an estimate of the number of bits used by each macroblock s[n] is produced.

By considering the restraint that the sum of the various t[n] be equal to the global target of each slice, Tslice, the following formula is obtained for calculating the BUP of each macroblock:

$$BUP = t[n] = Tslice \cdot \frac{s[n]}{\sum s[n]} \tag{17}$$

The variable $\Sigma s[n]$ is equal to the sum of the slice bits obtained from the pre-analysis.

Equation (16) is used as a global target for the current slice (Tslice) rather than for the whole picture (T*). A first way to determine it is to consider the estimated bits uniformly distributed on the different slices while taking as a reference the uniform distribution of bits among the various macroblocks. This type of approach may deviate from reality when, for instance, a part of the picture requires more bits than another one. According to the invention, this drawback is effectively overcome by introducing a Target Bit Usage Profile, as better explained in the ensuing description.

It should be noted that for the case of a pre-analysis with calculation of the entropy, as per the approach used by Mian et al., the s[n] may be obtained only by knowing the bits effectively used in encoding the preceding pictures because the pre-analysis with calculation of histograms generates only global estimates for the GOS rather than for the individual n-th macroblock. This is regardless of the type I, P or B.

Target Bit Usage Profile In An Application With The Pre-Analysis Following a Keesman et al Approach. By considering uniform the distribution of the target bit on the slices, we experimentally obtain a decrement of the PSNR as compared to an algorithm with pre-analysis of the whole picture and a worsening of the error on a single macroblock. These consequences are effectively remedied by defining a Target Bit Usage Profile (TBUP). This represents an estimate of the target bit profile among the different slices, and is evaluated in the pre-analysis phase or derived from the encoding of preceding pictures.

At the end of the encoding process or of the pre-analysis of the preceding picture, the number of total bits used by the encoder for each GOS SGOS and the number of total bits for each slice of the GOS being processed, Sslice, are stored. By considering, for example, the j-th GOS containing no more than 4 slices:

$$S_{GOS} = \sum_{k=1}^{4} Sslice[k] \tag{18}$$

$$Sprec = \sum_{k=1}^{NumMax} S_{GOS}[k]$$

The variable NumMax is the maximum number of GOS in a picture and Sprec represents the total number of bits for the whole picture.

The target for the n-th GOS of the current picture, representing the Target Bit Usage Profile (TBUP), is given by:

$$TBUP = T_{GOS}[n] = \frac{S_{GOS}[n]}{Sprec} \cdot T* \tag{19}$$

The T* is equal to the target of the whole picture, and is found at the beginning of the GOP encoding process by the Target Bit Allocation technique. The sum of all the $TG_{GOS}$ in a picture is equal to T*.

If the GOS contains only one slice: Tslice=$T_{GOS}$ and Sslice=$S_{GOS}$. In this case, the BUP is given by equation (17) is rewritten below as equation (20):

$$BUP = t[n] = Tslice \cdot \frac{s[n]}{\sum s[n]} \tag{20}$$

As above, $\Sigma s[n]$ is equal to the sum of the slice bits obtained by the pre-analysis with preceding of the current slice of the current picture.

Instead, if the GOS contains more slices (4 at the most), the BUP is more accurate because it tends to become more similar to the BUP of the whole picture. This would be the case if the GOS contains all the slices of a picture. Thus, equation (17) becomes:

$$BUP = t[n] = T_{GOS} \cdot \frac{s[n]}{\sum s[n]} \tag{21}$$

In this case, $\Sigma s[n]$ is equal to the sum of the GOS bits derived from the pre-analysis with preceding of the current GOS of the current picture.

It should be noted that the values of $S_{GOS}$ and Sslice may be obtained in different ways depending on whether a knowledge of the bits calculated during the pre-analysis of the preceding pictures or during their effective encoding is used. This is in both cases regardless of their type: I, P or B.

Target Bit Usage Profile In An Application With Pre-Analysis According To Mian et al. At the end of the coding or of the pre-analysis of the preceding picture, the number of total bits $S_{GOS}$ produced by the encoder for each GOS and the number of total bits Sslices per each slice of the GOS being processed are stored with the conditions that, for the j-th GOS containing at most four slices:

$$S_{GOS} = \sum_{k=1}^{4} Sslice[k] \tag{22}$$

$$Sprec = \sum_{j=1}^{NumMax} S_{GOS}[j]$$

The variable NumMax is the maximum number of GOS in a picture, while Sprec represents the total number of bits used for the preceding whole picture, either encoded or pre-analyzed.

The target for the n-th GOS of the current picture, representing the Target Bit Usage Profile (TBUP), is given by:

$$TBUP = T_{GOS}[n] = \frac{S_{GOS}[n]}{Sprec} \cdot T* \tag{23}$$

The variable T* is equal to the target for the whole picture, and is found at the beginning of the GOP encoding process using the Global Target Bit Allocation. The sum of all the $T_{GOS}$ in a picture must be equal to T*.

In calculating Tslice, only data derived from pre-analysis with entropy calculation of the current GOS of the current picture is used. That is:

$$Tslice[k] = T_{GOS}[j] \cdot \frac{Eslice[j][k]}{E_{GOS}[j]} \tag{24}$$

The variable EGOS represents the number of total bits of the j-th GOS being processed. This is estimated by the entropy, while Eslice[j] [k] is the number of estimated bits of the single k-th slice with the condition that for the j-th GOS, it is:

$$E_{GOS}[j] = \sum_{k=1}^{4} Eslice[j][k] \tag{25}$$

The above equation (24) is not necessary in a pre-analysis conducted according to Keesman et al. because if the GOS contains only one slice, Tslice is calculated with equation (20). Otherwise, $T_{GOS}$ is calculated with equation (21).

Equation (17) which calculates the BUP may be transformed to the following expression:

$$BUP = t[n] = Tslice \cdot \frac{s[n]}{\sum s[n]} \tag{26}$$

In this case, s[n] and Σs[n] are obtained from the effective coding of the corresponding GOS of the preceding picture because information on the current picture is not available.

Formally, equations (20) (Keesman et al.) and (26) (Mian et al.) are s[n] and Σs[n] are derived from the effective encoding data of the corresponding GOS (including more than one slice) of the preceding picture (equation 26).

Required Memory Size For Pre-Analysis Data. As already mentioned, the fact of carrying out a pre-analysis only on the GOS involves a large reduction of the memory necessary for storing the data. By assuming to use a 32 bit precision arithmetic architecture, the memory size in case of pre-analysis on a four slice GOS typically may be 4×32 bits×45 macroblocks per slice. This is a float type according to the C computer program language. That is, there is a total of 5,760 bits for any significant information, such as DCT bits, overhead bits and total bits. In contrast, in case of pre-analysis conducted on a whole picture according to a prior art system, the required memory size would be 32 bits×1, 620 macroblocks. That is, there is 51,840 bits of significant information. This implies a saving of 46,080 bits or about 88%. If the GOS contains only one slice, the memory saving increases to 97%.

The memory capacity necessary to store the Sslice information deriving from a pre-analysis of effective coding of the preceding picture is negligible. It is equal to the number of slices in a picture, that is, 32 bits×36 slices =1,152 bits. There are 36 slices in a PAL picture having 576 active lines.

Local Control. The controller used for a local control is of the integrative-proportional type. Once the combined processing according to the known Bit Usage Profile technique, and according to the technique of the present invention that introduces the Target Bit Usage Profile have been completed, it is possible to determine the Qj control parameters at the local level (equation (10)). This may then be used through an adaptive quantization for calculating the real quantization parameter mquant. These techniques are used to find the target number of bits for each macroblock t[n]. The Bit Usage Profile technique may be according to one of the equations (20), (21) and (26). The Target Bit Usage Profile is according to one of equations (19), (23) and (24).

Symbolically, equation (10) which describes the local control model, remains valid and unchanged with the only difference that t[n] of equation (8) is the BUP that is alternatively determined by the equations (20), (21) or (26). For calculating the local error of each first macroblock of a slice, it is necessary to store in the memory the datum corresponding to the target number of bits found for the last macroblock of the preceding slice. In this way, it is avoided that the slices are not considered as separate items so that the transition from one to the other may be visible in the encoded picture.

Experimental Measurements. The following paragraphs report the experimental results of different implementations of the method of the invention of GOS pre-analysis. As samples of video sequences have been used, the so-called Calendar, and Stefan and Flowers sequences have been respectively coded at 4 Mbps and 10 Mbps.

By not having available pre-analysis data of a whole current picture but only those of a GOS (four slices at the most), a mix is done of the pre-analysis data of the preceding picture (regardless of its type I, P or B) and/or of the data deriving from the effective coding of the preceding picture (regardless of its type I, P or B). Equations (19) and (23) (TBUP) are applied according to an embodiment of the method of the invention.

However, to apply equation (26) (BUP) in a Mian et al. compliant embodiment, only data originating from coding the preceding picture may be used. In contrast, the equations (20) and (21) according to an embodiment compliant with the method of Keesman et al. require data derived from the pre-analysis of the current GOS of the current picture.

According to an embodiment compliant with the method of Mian et al., to implement equation (24) for Tslice, only data originating from the pre-analysis of the coding of the current picture may be used.

Figure 5:
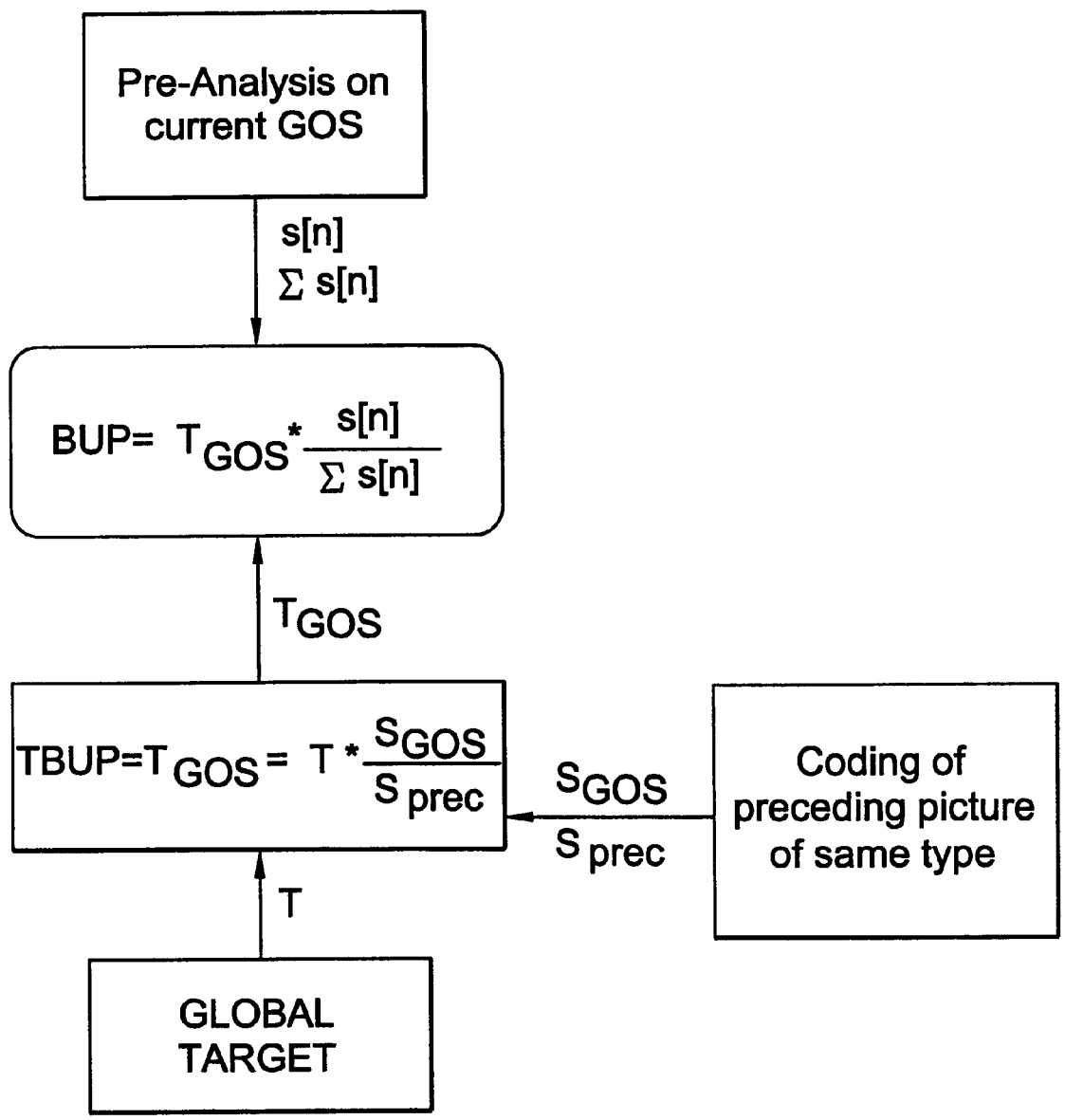
FIG. 5 is a flow chart of an embodiment of the present invention (K.sl.1) based on a pre-analysis with preceding of one slice of the current picture to implement the BUP, and based on the data resulting from the effective encoding of the preceding picture of the same type of the current one for implementing the TBUP.

Pre-Analysis With Precoding Of Only One Slice. With regard to the pre-analysis with preceding, a pre-analysis on a GOS with only one slice has been simulated. The embodiments of the algorithm tested were the following:

1) K.sl.1: Kob=1.0 the TPUB ($S_{GOS}$ and Sprec of equation (19)) is derived from the coding bits of the immediately preceding picture of the same type (I, P, B), as shown in FIG. 5.

2) K.sl.2: Kob 1.0 and the TPUB ($S_{GOS}$ and Sprec of equation (19)) derived from the bits of the pre-analysis the immediately preceding picture, regardless of its type.

Figure 6:
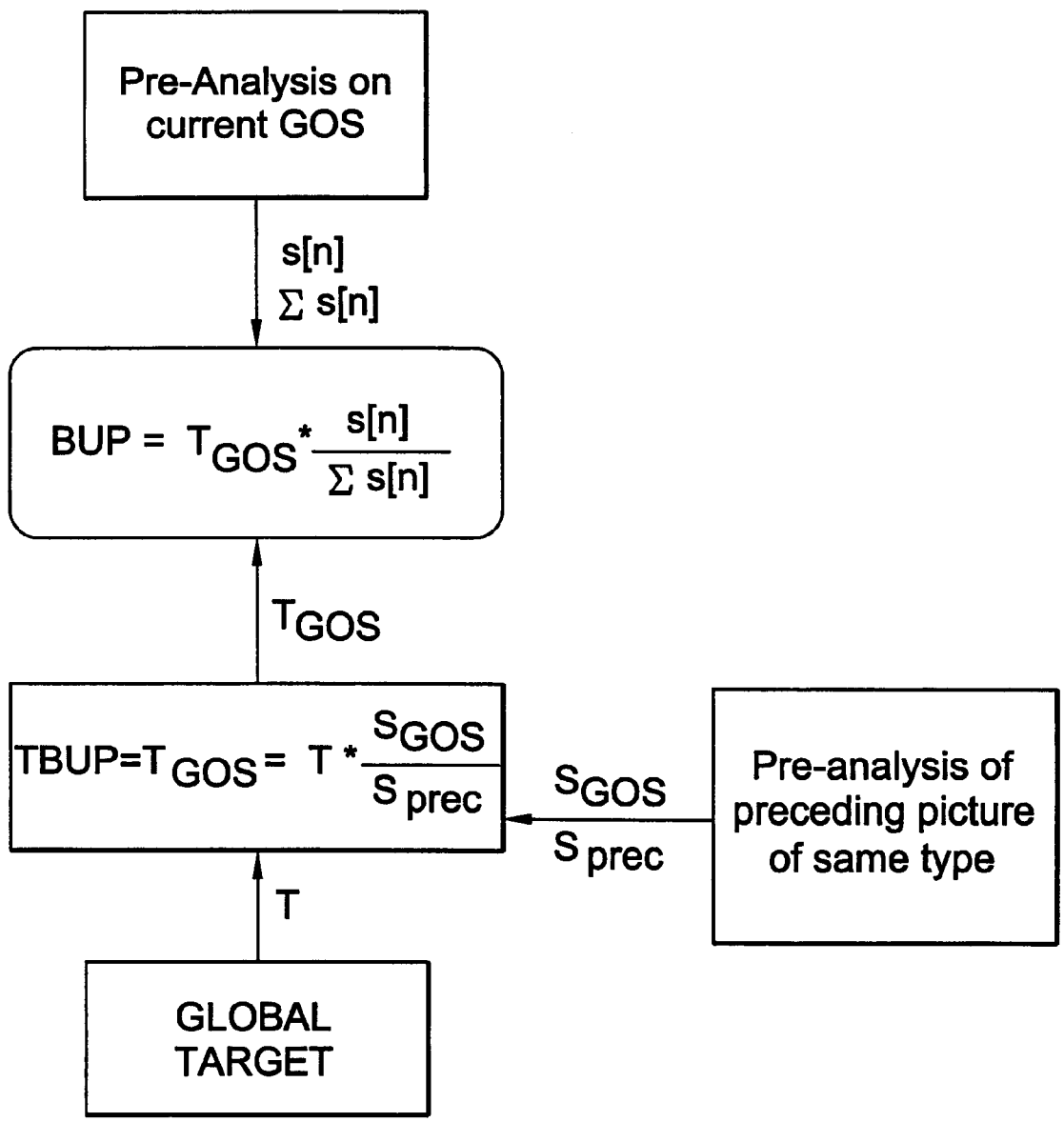
FIG. 6 is a flow chart of an embodiment of the present invention (K.sl.3) based on a pre-analysis with preceding of one slice of the current picture to implement the BUP, and based on the data resulting from the pre-analysis with preceding of the preceding picture of the same type of the current one for implementing the TBUP.

3) K.sl.3: Kob 1.0 and the TPUB ($S_{GOS}$ and Sprec of equation (19)) derived from the pre-analysis bits of the immediately preceding picture of the same type (I, P or B), as shown in FIG. 6.

4) K.sl.4: Kob 1.0 and the TPUB ($S_{GOS}$ and Sprec of equation (19)) derived from the pre-analysis bits of the immediately preceding picture, regardless of its type if P or B, and if type I, the pictures were separately considered by referring to the picture I of the preceding GOP.

5) K.sl.5: same as K.sl.3, the difference is that during the Target Bit Allocation phase to the I pictures is assigned the estimated number of bits incremented by 20% while the one to the P pictures is incremented by 5% to produce a less accurate bit-rate control, but an enhanced uniformity of the quality of the pictures.

6) K.sl.6: same as K.sl.4, however Kob=1.4 instead of Kob=1.0.

7) K.sl.7: same as K.sl.3, however Kob=1.4 instead of Kob=1.0.

For all these test embodiments, the pre-analysis on the current GOS of the current picture is only used for applying equation (20) to estimate s[n] and Σs[n].

Table 1 compares the performance of the slice algorithms of the invention with that of the method of Keesman et al. and of the TM5 model for the Calendar sequence coded at 4 Mbps. The figures of interest are as follows:

1) The average percentage error for the GOP (Err. GOP), calculated as the difference between the Target Bits of a single GOP and the effective number of bits used in encoding, is averaged among all the GOPs of the sequence;

2) Average percentage error among the target bits and those effectively used, for each picture, are averaged for the whole sequence (Err. SEQ);

3) The picture PSNR is averaged on the whole sequence;

4) The PSNR of each single macroblock is averaged on all the pictures of the sequence. This measure takes into a greater consideration of the artifacts at the macroblock level. These would be inevitably hidden by the intrinsic averaging of the PSNR parameter that traditionally is calculated on the whole picture;

5) The mquant is average for all the macroblocks of the sequence;

6) The mean deviation of the mquant is for the entire sequence with respect to the above average value.

It may be noted that the TM5 model gives the highest PSNR, though to the detriment of a less accurate control of the bit-rate. An average error is 1.61% on the GOP and 0.19% on the sequence. The Keesman et al. algorithm with the pre-analysis of the whole current picture provides a very accurate control. An average error is 0.0028% on the GOP and 0.00006% on the sequence. The algorithm is better by at least 3 to 4 orders of magnitude than the TM5. In contrast, the different implementations of the method of the invention of slice pre-analysis lose at most one order of magnitude in terms of the precision over a sequence. However, a more accurate control is provided than with the TM5 model. Differences of the average PSNR among macroblock are even smaller. Table 1 reports these results.

TABLE 1

| Algorithm | Error GOP (%) | Error SEQ (%) | PSNR average on frames | PSNR average on MBs | Mquant average on sequence | Mean deviation on sequence |
|---|---|---|---|---|---|---|
| TMS | 1.61 | 0.19 | 27.88 | 30.78 | 32.0 | 5.34 |
| Keesman | 0.0028 | 0.00006 | 27.03 | 29.99 | 32.7 | 2.0 |
| K.sl.1 | 0.01 | 0.0009 | 26.3 | 29.7 | 37.1 | 3.55 |
| K.sl.2 | 0.004 | 0.00008 | 26.97 | 30.0 | 34.1 | 2.7 |
| K.sl.3 | 0.003 | 0.0003 | 26.95 | 29.96 | 33.6 | 2.4 |
| K.sl.4 | 0.003 | 0.0002 | 26.92 | 29.94 | 33.9 | 2.5 |
| K.sl.5 | 0.007 | 0.06 | 27.46 | 30.47 | 32.8 | 3.8 |
| K.sl.6 | 0.01 | 0.00018 | 27.64 | 30.73 | 34.8 | 2.5 |
| K.sl.7 | 0.02 | 0.0008 | 27.8 | 30.8 | 34.0 | 6.7 |

With regard to the measures of the quality of the pictures in terms of PSNR, the Keesman et al. algorithm loses about 0.8 dB as compared to the TM5 model. However, such a degradation is considered negligible according to subjective tests. The PSNR is an objective measure that becomes well correlated to visual evaluations starting from differences above 0.8–1.0 dB. The PSNR differences between the various test embodiments of the method of the invention, based on a slice pre-analysis, and the method of Keesman et al. are much smaller than the range. Often, the comparison is in favor of the slice pre-analysis method of the invention.

The K.sl.3 algorithm may be considered the best, and for such a preferred implementation, the results obtained for the Stefan and Flowers sequences (coded at 4, Mbps) are also reported in the following table.

TABLE 2

| Sequence/ algorithm | Error GOP (%) | Error SEQ (%) | PSNR average on frames | PSNR average on MBs | Sequence/ algorithm Mquant average on sequence | Mean deviation on sequence |
|---|---|---|---|---|---|---|
| Stefan/ TM5 | 2.02 | 0.12 | 30.0 | 33.4 | 29.9 | 7.6 |
| Stefan/ Keesman | 0.006 | 0.0006 | 29.6 | 33.1 | 29.7 | 5.9 |
| Stefan/ K.sl.3 | 0.01 | 0.00008 | 29.3 | 32.9 | 33.0 | 7.7 |
| Flowers/ TM5 | 1.03 | 0.007 | 28.33 | 32.72 | 32.1 | 6.25 |
| Flowers/ Keesman | 0.0014 | 0.0003 | 27.59 | 31.96 | 32.49 | 2.49 |
| Flowers/ K.sl.3 | 0.002 | 0.0005 | 27.39 | 31.84 | 33.2 | 2.7 |

As far as quantization is concerned, the above tables report also the average value of the mquant of all the macroblocks of the sequences. This is done as an index having a spatial quality. A high value means a strong quantization and a consequent blurring of the picture, while a low value of maquant means a finer quantization. This results in a minimum loss of picture content.

From this point of view, it is evident that the TM5 model having a less accurate bit-rate control has average values consistently lower than the other algorithms with preceding. Nevertheless, the mean deviation of TM5 is higher than in the algorithms with preceding. The only exception is for the Stefan sequence. This means that the local quality of the algorithm with precoding is more uniform over the whole picture.

Such an effect may compensate the slight increment of the average mquant. It may be better to watch pictures of uniform quality, even if slightly more quantizer, rather than pictures with zones of significant quantization differences of nonuniform quality. The optimal performances of the K.sl.3 version of the algorithm of the invention compared to those obtained with preceding of the whole picture should be noted. Relative to mean deviation, even with a limited information derived form the pre-analysis of a single slice, a mean deviation very close to the one that may be obtained with the pre-analysis of the whole picture is obtained.

The following table reports these measures on the sequences coded at 10 Mpbs.

TABLE 3

| Sequence/ algorithm | Error GOP (%) | Error SEQ (%) | PSNR average on frames | PSNR average on MBs | Mquant average on sequence | Mean deviation on sequence |
|---|---|---|---|---|---|---|
| Calendar/ TM5 | 0.54 | 0.1 | 33.2 | 35.6 | 13.4 | 2.22 |
| Calendar/ Keesman | 0.0003 | 0.00009 | 32.36 | 34.88 | 13.9 | 1.2 |
| Calendar/ K.ls.3 | 0.0006 | 0.00007 | 32.36 | 34.95 | 14.0 | 1.3 |
| Stefan/ TM5 | 0.3 | 0.05 | 35.73 | 37.84 | 11.69 | 2.53 |
| Stefan/ Keesman | 0.0003 | 0.0001 | 35.74 | 37.8 | 11.5 | 2.0 |
| Stefan (k.sl.3) | 0.001 | 0.00008 | 35.42 | 37.62 | 12.6 | 2.9 |
| Flowers (TM5) | 0.2 | 0.03 | 33.7 | 37.27 | 13.43 | 2.43 |
| Flowers (K. orig.) | 0.002 | 0.00006 | 33.45 | 36.79 | 13.4 | 1.5 |
| Flowers (K.sl.3) | 0.002 | 0.0001 | 33.36 | 36.6 | 13.6 | 1.6 |

By increasing the bit-rate, the average values of PSNR and maquant become very similar for all the three methods compared; namely: TM5, preceding of a complete picture and preceding of a single slice (invention). The accuracy of the control is significantly better in precoding systems.

The Problem Of Scene Changes. To test the behavior of the different methods during changes of scene, some tests simulations were carried out on a sequence (Puzzle) of 50 pictures coded at 4 Mbps. This was artificially generated by copying frames belonging to different sequences. In particular, the pictures 1 to 7 were taken from the Calendar sequence, 8 to 21 from a Tennis Table sequence, 22 to 23 from Edit, 34 to 38 from Voitur, and 39 to 50 from Popple.

TABLE 4

| Algorithm | Error GOP (%) | Error SEQ (%) | PSNR average on frames | PSNR average on MBs | Mquant average on sequence | Mean deviation on sequence |
|---|---|---|---|---|---|---|
| TM5 | 3.85 | 0.35 | 29.6 | 31.6 | 30.16 | 8.89 |
| Keesman | 0.002 | 0.00005 | 29.14 | 31.2 | 30.41 | 8.42 |

TABLE 4-continued

| Algorithm | Error GOP (%) | Error SEQ (%) | PSNR average on frames | PSNR average on MBs | Mquant average on sequence | Mean deviation on sequence |
|---|---|---|---|---|---|---|
| K.sl.3 | 0.01 | 0.0008 | 28.65 | 31.0 | 33.79 | 8.9 |

From the results of Table 4, it may be noted that the bit-rate control is more accurate for the two pre-analysis algorithms as compared to the TM5 one. The slight increase of the error and the PSNR with the pre-analysis algorithm of the invention involve only a single slice (K.sl.3). This is with respect to the one with predecoding of the whole picture (Keesman et al.). This is due to the fact that despite the exploitation of information derived from pre-analysis of the current slice of the current picture, some parameters, such as the complexity and the overhead, are inevitably calculated by referring to past pictures. Instead, the complete picture pre-analysis algorithm of the prior art calculates all the needed quantities for the current picture before its actual encoding. This better determines an intervening change of scene.

To improve even further the control in a method according to the present invention, it is possible to use additional information deriving it from the motion estimation block to improve the ability to recognizing changes of scene. Accordingly, the picture corresponding to a change of scene may be coded as an I-picture if the bit-rate control system has a sufficient number of bits available. The capacity to carry out a replay with fast-forward or with fast-rewind, based on a fixed dimension of GOP (e.g., 12 pictures), is not lost because there will always be at least one I-picture every 12 pictures in a GOP of a fixed size.

Pre-Analysis Based On The Entropy Calculation On More Than One Slice. In the case of an alternative embodiment of the method of the invention, wherein the pre-analysis is carried out by way of a calculation of the entropy, a pre-analysis on a GOS with 1, 2, 3 and/or 4 slices was hypothesized. The results relate to the following variants tested with a 4-slice GOS.

Figure 7:
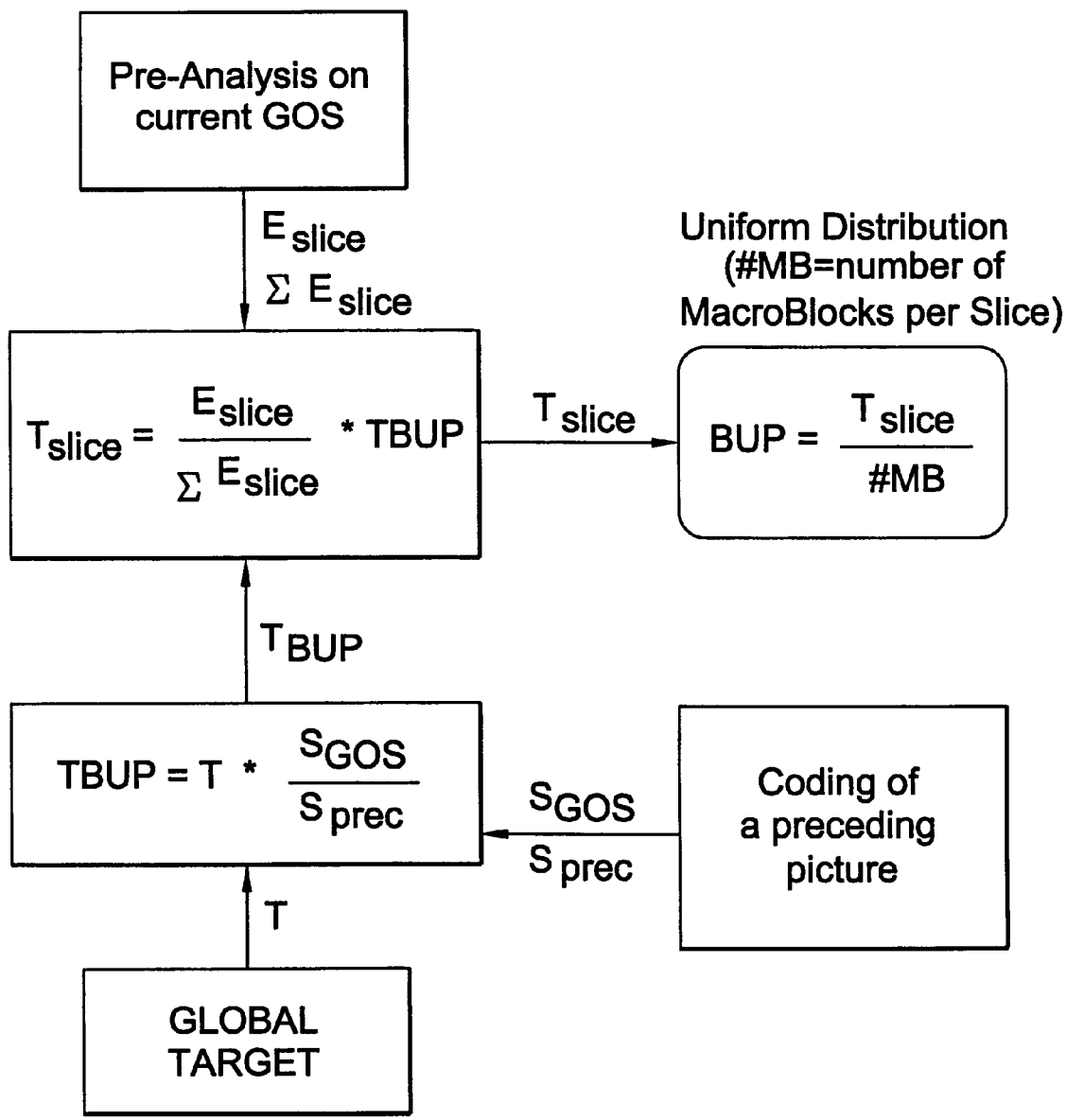
FIG. 7 is a flow chart of an embodiment of the present invention (qj_stat) based on a pre-analysis with entropy computation on a GOS of the current picture for calculating the bits target of a slice within the above mentioned GOS (Tslice), based on the data resulting from the effective encoding of the preceding picture of the same type for implementing the TBUP, and also based on a BUP of a simply uniform distribution.

1) Qj_stat: the reference Qj of the whole picture is assumed computed from the pre-analysis with entropy calculation on the first GOS of the current frame. The sum of the estimated bits per slice ($E_{GOS}$ and Eslice of equation (24)) is computed by way of a pre-analysis of the GOS of the current picture. Instead of using the BUP of equation (26), a uniform bit distribution within the single slice is assumed. The TBUP of equation (23) exploits the information $S_{GOS}$ and Sprec relative to the effective encoding of the preceding picture, as illustrated in FIG. 7.

Figure 8:
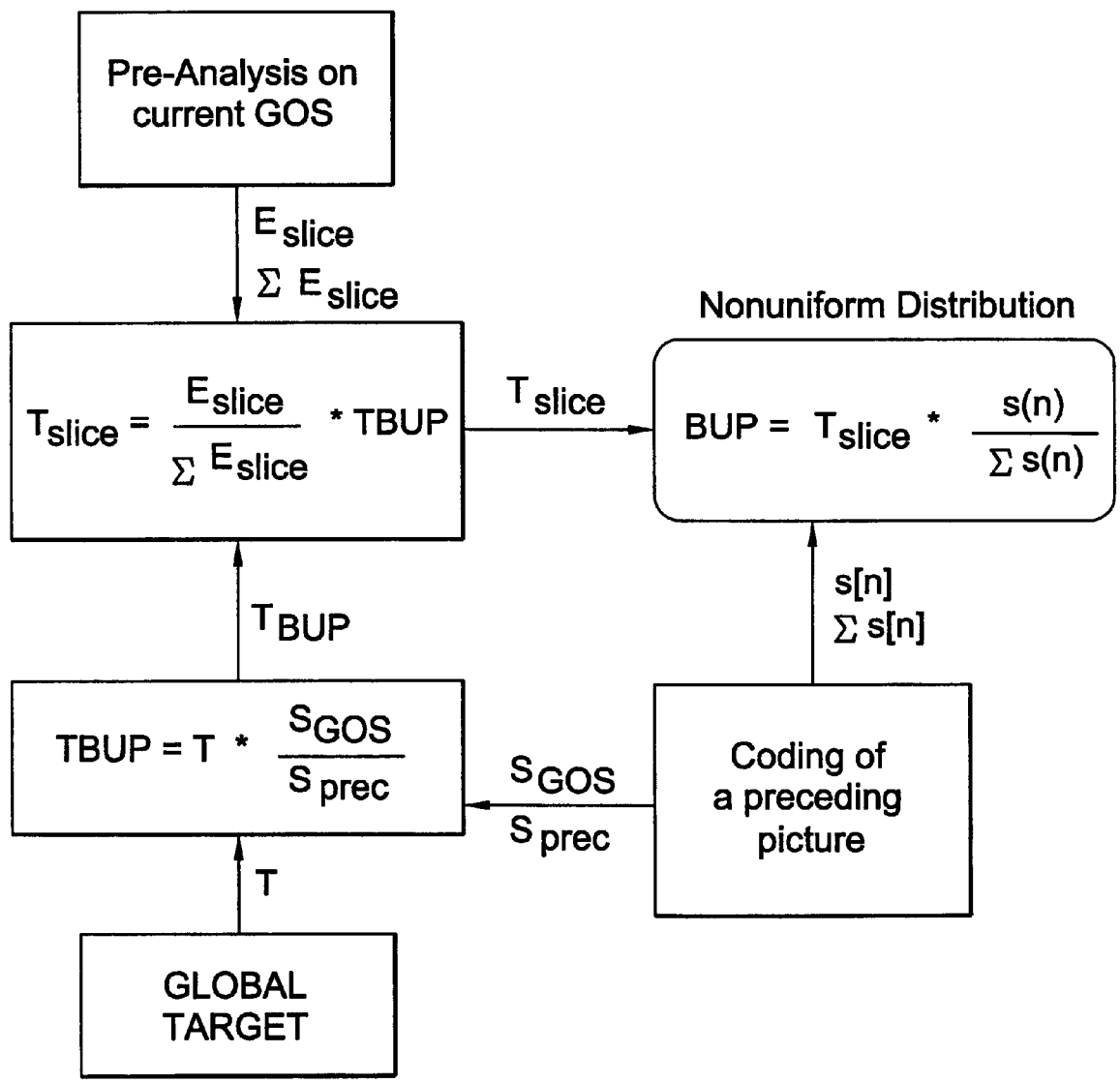
FIG. 8 is a flow chart of an embodiment of the present invention (profprec) based on a pre-analysis with entropy calculation on a GOS of the current picture for calculating the bit target of a slice within the above mentioned GOS (Tslice), and based on data resulting from the effective encoding of the preceding picture of the same type for implementing both the TBUP and the BUP.

2) Prof_prec: the reference Qj is calculated as in Qj_stat. The bit sum per slice ($E_{GOS}$ and Eslice of equation (24)) is calculated by way of a pre-analysis of the GOS of the current picture. The BUP (s[n] and Σs[n]) of equation (26) are derived from the effective bits of the previously coded picture. The TBUP of equation (23) exploits the information $S_{GOS}$ and Sprec relative to the effective encoding of the preceding picture, as illustrated in FIG. 8.

Figure 9:
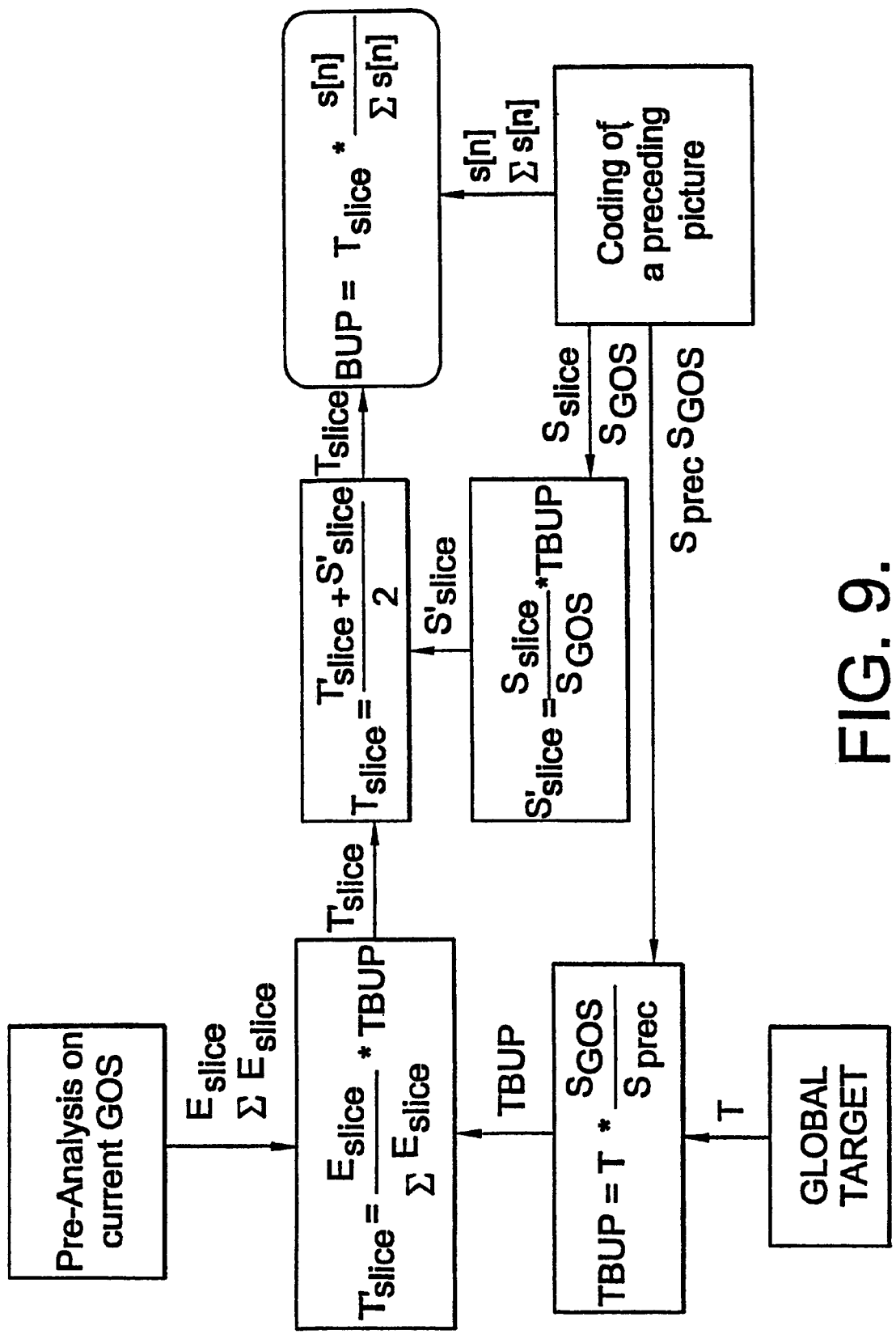
FIG. 9 is a flow chart of an embodiment of the present invention (profmed) based on using data resulting from the effective coding of the preceding picture of the same type for implementing both the TBUP and the BUP, and based on the average of data from the effective encoding of the preceding picture and from the pre-analysis and entropy calculation on a GOS of the current picture for calculating the bit targets of a slice within the GOS (Tslice).

3) Prof_medio: the reference Qj is calculated as in Qj_stat. The bit sum per slice is obtained by averaging two values. The first value is obtained by exploiting the pre-analysis of the current GOS of the current picture. The second value is obtained from the effective bits of the previously coded picture. The BUP is calculated as in Prof_prec. Finally, a Kub=1.4 is used instead of Kub=1 as used in the two preceding test embodiments. The algorithm is illustrated in FIG. 9.

By coding the sequences at 4 Mbps, the results shown in the following table are obtained. It appears evident a close comparison between the TM5 model and the control methods that use a pre-analysis with calculation of the entropy either carried out on the whole current picture, as in the known Keesman et al. approach, or on a single GOS according to the present invention.

TABLE 5

| Sequence/algorithm | Error GOP (%) | Error SEQ (%) | PSNR average on frames | PSNR average on MBs |
|---|---|---|---|---|
| Calendar/TM5 | 1.6126 | 0.1337 | 27.88 | 30.78 |
| Calendar/Qj_stat | 0.0276 | 0.00803 | 26.95 | 29.61 |
| Calendar/Prof_prec | 0.0736 | 0.00700 | 26.21 | 28.94 |
| Calendar/Prof_medio | 0.0509 | 0.00715 | 27.08 | 29.94 |
| Flowers/TM5 | 1.6568 | 0.20034 | 28.36 | 32.72 |
| Flowers/Qj_stat | 0.0706 | 0.00258 | 27.63 | 31.57 |
| Flowers/Prof_prec | 0.2142 | 0.00404 | 26.70 | 31.04 |
| Flowers/Prof_medio | 0.2712 | 0.00567 | 27.68 | 31.91 |

The performances of the algorithm of the invention with pre-analysis carried out by way of the calculation of the entropy are approximately midway between those of the TM5 model and those with preceding. This is because the entropy is just an approximation measure of the effective bit-rate. The pre-analysis with preceding is more reliable in calculating the bit-rate. In any case, the control through a calculation of the entropy is simpler to implement because it is sufficient to produce the histograms of the DCT coefficients rather than performing preceding.

By coding the sequences at 10 Mbps, the following results are obtained.

TABLE 6

| Sequence/algorithm | Error GOP (%) | Error SEQ (%) | PSNR average on frames | PSNR average On MBs |
|---|---|---|---|---|
| Calendar/TM5 | 0.67 | 0.12333 | 32.51 | 34.99 |
| Calendar/Qj_stat | 0.0288 | 0.00726 | 31.86 | 34.16 |
| Calendar/Prof_prec | 0.0102 | 0.00186 | 30.49 | 33.47 |
| Calendar/Prof_medio | 0.0045 | 0.00313 | 31.76 | 34.38 |
| Flowers/TM5 | 0.9623 | 0.17519 | 33.05 | 36.72 |
| Flowers/Qj_stat | 0.0142 | 0.00183 | 32.9 | 35.94 |
| Flowers/Prof_prec | 0.0058 | 0.00041 | 32.05 | 35.53 |
| Flowers/Prof_medio | 0.0071 | 0.00023 | 32.58 | 36.09 |

In this case, it may be noticed that by increasing the bit-rate, the average PSNR values are very similar for all the compared methods. However, the accuracy of the control is definitively better for pre-analysis systems. In particular, by considering the results at 4 Mbps and at 10 Mbps, the Prof_medio embodiment of the algorithm of the invention shows the best performance overall.

That which is claimed is:

1. A method for providing a constant bit-rate (CBR) at a certain value responsive to optimization criteria for transferring a data stream of encoded picture sequences, the method comprising the steps of:
   a) estimating a number of bits for encoding a current picture and a successive picture belonging to a same group of pictures (GOP) of a sequence based on a target number of coding bits for each picture of the sequence as a function of encoding data of pictures preceding the current picture;
   b) determining a reference value of a quantization parameter at a local level for an n-th macroblock of data that complies with a limit established by the estimated number of bits for the n-th macroblock;
   c) calculating an effective quantization parameter for each macroblock as a function of a filling state of an output buffer of the data stream of coded data and of an activity parameter of the macroblock;
   d) calculating a distribution profile of target bits over a picture using a pre-analysis of at least one line of a macroblock (GOS) of less than the whole current picture, distributing the allocated bits as a function of the local complexity of the single n-th macroblock and of the number of bits effectively used in the pre-analysis, effective encoding of the GOS of the preceding picture being used for distributing the allocated bits as a function of the local complexity of the n-th single macroblock and of the number of bits effectively used during the effective coding;
   e) calculating a distribution profile of target bits over the GOS given by a ratio between the estimated number of bits required for the encoding obtained using a pre-analysis of the current GOS of less than the whole current picture;
   f) intermediately computing a distribution profile of the target bit among the different lines of macroblocks based upon the ratio between entropv values derived from a pre-analysis of the current GOS less than the whole current picture multiplied by the target number of a bit usage profile; and
   g) the pre-analysis of the current GOS being carried out using a calculation of the entropy on histograms of the discrete cosine transform (DCT) coefficients of the whole GOS.

2. A method according to claim 1, wherein step a) further comprises estimating the number of bits based on results of the pre-analysis of step f).

3. A method according to claim 1, wherein step e) further comprises calculating the distribution profile of target bits from the effective coding of the corresponding GOS of the preceding current picture multiplied by the target number of bits for the whole picture.

4. A method according to claim 1, wherein the effective encoding of the GOS of the preceding picture in step d) is used for distributing the allocated bits as a function of the local complexity of the n-th single macroblock and of the number of bits effectively used during the effective coding.

5. A method according to claim 1, wherein the steps are implemented in accordance with the MPEG-2 standard.

6. A method according to claim 1, wherein the steps are implemented in accordance with the MPEG-1 standard.

7. A method for providing a constant bit-rate (CBR) at a certain value responsive to optimization criteria for transferring a data stream of encoded picture sequences, the method comprising the steps of:
   a) estimating a number of bits necessary for encoding a current picture and a successive picture belonging to a same group of pictures (GOP) of a sequence based on a target number of coding bits for each picture of the sequence as a function of encoding data of pictures preceding the current picture;
   b) determining a reference value of a quantization parameter at a local level for an n-th macroblock of data that complies with a limit established by the estimated number of bits for the n-th macroblock;
   c) calculating an effective quantization parameter for each macroblock as a function of a filling state of an output buffer of the data stream of coded data and of an activity parameter of the macroblock;

d) calculating a distribution profile of target bits over a picture using a pre-analysis of at least one line of a macroblock (GOS) of less than the whole current picture, distributing the allocated bits as a function of the local complexity of the single n-th macroblock and of the number of bits effectively used in the pre-analysis;

e) calculating a distribution profile of target bits over the GOS given by a ratio between the estimated number of bits required for the encoding obtained using a pre-analysis of the current GOS of less than the whole current picture, and calculating the distribution profile of target bits from the effective coding of the corresponding GOS of the preceding picture multiplied by the target number of bits for the whole current picture;

f) intermediately computing a distribution profile of the target bit among the different lines of macroblocks based upon the ratio between entropy values derived from a pre-analysis of the current GOS of less than the whole current picture is multiplied by the target number of a bit usage profile; and g) the pre-analysis of the current GOS being carried out using a calculation of the entropy on histograms of the DCT coefficients of the whole GOS.

8. A method according to claim 7, wherein step a) further comprises estimating the number of bits based on results of the pre-analysis of step g).

9. A method according to claim 7, wherein the effective encoding of the GOS of the preceding picture in step d) is used for distributing the allocated bits as a function of the local complexity of the n-th single macroblock and of the number of bits effectively used during the effective coding.

10. A method according to claim 7, wherein the steps are implemented in accordance with the MPEG-2 standard.

11. A method according to claim 7, wherein the steps are implemented in accordance with the MPEG-1 standard.

12. A video encoder comprising:
a controller for controlling a bit-rate of a bitstream of encoded video sequences to be transmitted over a transmission channel at a constant transmission rate, said controller comprising
an output buffer, and
an integrative-proportional controller connected to said output buffer and having an input receiving contents of said output buffer, and having an output providing a compressed video sequence of moving pictures to generate the bit-stream to be transmitted through the transmission channel, each picture comprising a plurality of macroblocks of pixels compressed with transform coding and/or temporal prediction and/or bi-dimensional motion compensated interpolation techniques to produce respectively I and/or P and/or B frames;
said controller intermediately computing a distribution profile of target bits among different lines of macroblocks, named GOS, equal to a ratio between entropy values derived from a pre-analysis of the GOS of the current picture, and multiplying the ratio by a target number of a bit usage profile, the pre-analysis being carried out using a calculation of the entropy on histograms of transform coding coefficients of the whole GOS, and calculating a target number of a bit usage profile by the effective encoding of the corresponding GOS of the previous picture multiplied by a target number of bits for the whole current picture.

13. A video encoder according to claim 12, wherein said controller calculates the target number of the bit usage profile by performing a pre-analysis of the corresponding macroblock of the previous picture.

14. A video encoder according to claim 13, wherein the intermediately computed distribution profile of target bits among different lines of macroblocks is equal to a ratio between bit values derived from the pre-analysis of the current GOS of the current picture, and multiplying the ratio by the target number of the bit usage profile.

15. A video encoder according to claim 12, wherein intermediately computing the distribution profile of target bits among different lines of macroblocks comprises determining an average between the entropy value ratio derived from the pre-analysis of the current GOS of the current picture, and the effective bits computed during coding of the previous picture multiplied by the target number of the bit usage profile.

16. A video encoder according to claim 12, further comprising a memory for storing the pre-analysis data of GOS of the current picture and the data of an effective coding.

17. A video encoder according to claim 12, wherein said controller is compatible with the MPEG-2 standard.

18. A video encoder according to claim 12, wherein said controller is compatible with the MPEG-1 standard.

19. A method for controlling a bit-rate of a bitstream of encoded video sequences to be transmitted over a channel at a constant transmission rate comprising:
compressing a video sequence of moving pictures to generate the bitstream, each picture comprising a plurality of macroblocks of pixels compressed with transform coding and/or temporal prediction and/or bi-dimensional motion compensated interpolation techniques to produce respectively I and/or P and/or B frames;
intermediately computing a distribution profile of target bits among different lines of macroblocks, named GOS, equal to a ratio between entropy values derived from a pre-analysis of the GOS of the current picture, and multiplying the ratio by a target number of a bit usage profile;
the pre-analysis being carried out using a calculation of the entropy on histograms of transform coding coefficients of the whole GOS; and
calculating a target number of a bit usage profile by the effective encoding of the corresponding GOS of the previous picture multiplied by a target number of bits for the whole current picture.

20. A method according to claim 19, wherein calculating the target number of the bit usage profile comprises performing a pre-analysis of the corresponding GOS of the previous picture.

21. A method according to claim 19, wherein intermediately computing the distribution profile of target bits among different lines of macroblocks comprises determining an average between the entropy value ratio derived from the pre-analysis of the current GOS of the current picture, and the effective bits computed during coding of the previous picture multiplied by the target number of the bit usage profile.

22. A method according to claim 19, wherein the intermediately computed distribution profile of target bits among different lines of macroblocks is equal to a ratio between bit values derived from the pre-analysis of the current GOS of the current picture, and multiplying the ratio by the target number of the bit usage profile.

23. A method according to claim 22, wherein calculating the target number of a bit usage profile comprises computing a pre-analysis of the corresponding GOS of the previous picture.

* * * * *

UNITED STATES PATENT AND TRADEMARK OFFICE
CERTIFICATE OF CORRECTION

PATENT NO. : 6,215,820 B1
DATED : April 10, 2001
INVENTOR(S) : Daniele Bagni, Mattia De Bei, Gian Antonio Mian, Maria Luisa Sacchi It is certified that error appears in the above-identified patent and that said Letters Patent is hereby corrected as shown below:

Title page,
Item [75], delete: "Milan" insert -- Milano --

Column 3,
Line 2, delete: "$mquant[n]Qj[n]$" insert -- $mquant[n]=Qj[n]$ --

Column 4,
Line 49, delete: "$Ri=NiTi+NP...$" insert -- $Ri=NiT+Np...$ --

Column 5,
Line 10, delete: "Mp and Eb" insert -- Xp and Xb --
Lines 19, 22, and 23 delete: "Kub" insert -- Kpb --

Column 7,
Lines 33 and 43, delete: "$Q^J{}_{REF}$" insert -- $Qj_{REF}$ --

Column 8,
Line 52, delete: "ten] of" insert -- ten of --

Column 10,
Lines 32 and 35, delete: "preceding" insert -- precoding --
Line 46, delete: "(profprec)" insert -- (prof_prec) --
Line 54, delete: "(profmed)" insert -- (prof_med) --

Column 11,
Line 10, delete: "preceding" insert -- precoding --

Column 12,
Line 16, delete: "GOS SGOS" insert -- GOS, $S_{GOS}$ --
Line 41, delete: "$TG_{Gos}$" insert -- $T_{Gos}$ --
Line 64, delete: "preceding" insert -- precoding --

Column 13,
Line 42, delete: "EGOS" insert -- $E_{Gos}$ --
Line 67, delete: "are" insert -- are similar, but the main --

Column 15,
Line 6, delete: "preceding" insert -- precoding --
Lines 9, 13, 17, 22, 34, 35, 36, and 37, delete: "Kob" insert -- Kpb --

UNITED STATES PATENT AND TRADEMARK OFFICE
CERTIFICATE OF CORRECTION

PATENT NO. : 6,215,820 B1
DATED : April 10, 2001
INVENTOR(S) : Daniele Bagni, Mattia De Bei, Gian Antonio Mian, Maria Luisa Sacchi It is certified that error appears in the above-identified patent and that said Letters Patent is hereby corrected as shown below:

Column 16,
Line 66, delete: "maquant" insert -- mquant --

Column 17,
Lines 3 and 5, delete: "preceding" insert -- precoding --
Line 43, delete: "36.6" insert -- 36.8 --
Line 47, delete "maquant" insert -- mquant --

Column 18,
Line 67, delete: "Kub=1.4 is used instead of Kub=1" insert -- Kpb=1.4 is used instead of Kpb=1 --

Column 19,
Line 32, delete: "preceding" insert -- precoding --

Signed and Sealed this

Fourth Day of December, 2001

*Attest:*

NICHOLAS P. GODICI
*Attesting Officer*    Acting Director of the United States Patent and Trademark Office